United States Patent [19]
Arold et al.

[11] Patent Number: 5,085,266
[45] Date of Patent: Feb. 4, 1992

[54] MOTOR VEHICLE FILTER IN THE INLET STREAM OF A HEATING SYSTEM OR AIR-CONDITIONING SYSTEM OF A MOTOR VEHICLE

[75] Inventors: Klaus Arold; Heinz Koukal, both of Sindelfingen, Fed. Rep. of Germany

[73] Assignee: Mercedes-Benz AG, Fed. Rep. of Germany

[21] Appl. No.: 741,352

[22] Filed: Aug. 7, 1991

[30] Foreign Application Priority Data

Sep. 24, 1990 [DE] Fed. Rep. of Germany ....... 4030145

[51] Int. Cl.$^5$ .............................................. B60H 3/06
[52] U.S. Cl. .................................... 165/1; 165/16; 165/42; 165/119; 165/185; 55/267; 55/269; 55/498; 55/510; 237/12.3 A; 62/78; 454/158; 454/160
[58] Field of Search ................ 165/1, 2, 16, 42, 43, 165/119, 185; 98/2.11; 55/269, 267, 498, 510, 524; 237/12.3 A; 62/78

[56] References Cited

U.S. PATENT DOCUMENTS

| | | | |
|---|---|---|---|
| 1,896,640 | 2/1933 | Moulding | 55/510 |
| 2,521,060 | 9/1950 | Hallinan | 55/510 |
| 2,708,521 | 5/1955 | Saloum | 55/510 |
| 3,593,499 | 7/1971 | Kile | 55/267 |
| 3,722,182 | 3/1973 | Gilbertson | 98/2.11 |
| 4,598,686 | 7/1986 | Lupoli et al. | 55/267 |
| 4,702,753 | 10/1987 | Kowalczyk | 98/2.11 |
| 4,864,103 | 9/1989 | Bishop et al. | 55/269 |
| 4,975,099 | 12/1990 | Kaser et al. | 55/267 |
| 5,004,487 | 4/1991 | Kowalczyk | 55/269 |

FOREIGN PATENT DOCUMENTS

| | | | |
|---|---|---|---|
| 0176667 | 4/1986 | European Pat. Off. | 98/2.11 |
| 484701 | 1/1927 | Fed. Rep. of Germany | 55/510 |
| 2950179 | 6/1981 | Fed. Rep. of Germany | 98/2.11 |
| 3003222 | 8/1981 | Fed. Rep. of Germany | 98/2.11 |
| 3317851 | 11/1984 | Fed. Rep. of Germany | 98/2.11 |
| 3626391 | 2/1988 | Fed. Rep. of Germany | 98/2.11 |
| 3741504 | 6/1989 | Fed. Rep. of Germany | 98/2.11 |
| 0004412 | 1/1985 | Japan | 98/2.11 |
| 0080125 | 4/1987 | Japan | 98/2.11 |
| 0021005 | 4/1989 | Japan | 98/2.11 |
| 1162465 | 6/1985 | U.S.S.R. | 55/267 |

*Primary Examiner*—John Ford
*Attorney, Agent, or Firm*—Evenson, Wands, Edwards, Lenahan & McKeown

[57] ABSTRACT

A filter in the inlet stream of a heating system or air-conditioning system of a motor vehicle for retaining noxious gaseous air components has the form of a tubular section which has air flowing through it transversely. The filter can be sealed at one end by a flap. For the purpose of rapidly implementable desorption with low expenditure, the filter be constructed from layered discs filled with activated carbon. The discs are separated from one another in each case by an intermediate layer consisting of material with good heat-conducting properties. The discs and the intermediate layers are clamped to each other by armatures penetrating the discs in the direction of the central longitudinal axis of the tubular section. The armatures, which have a heat-conducting connection to the intermediate layers, can be heated.

4 Claims, 1 Drawing Sheet

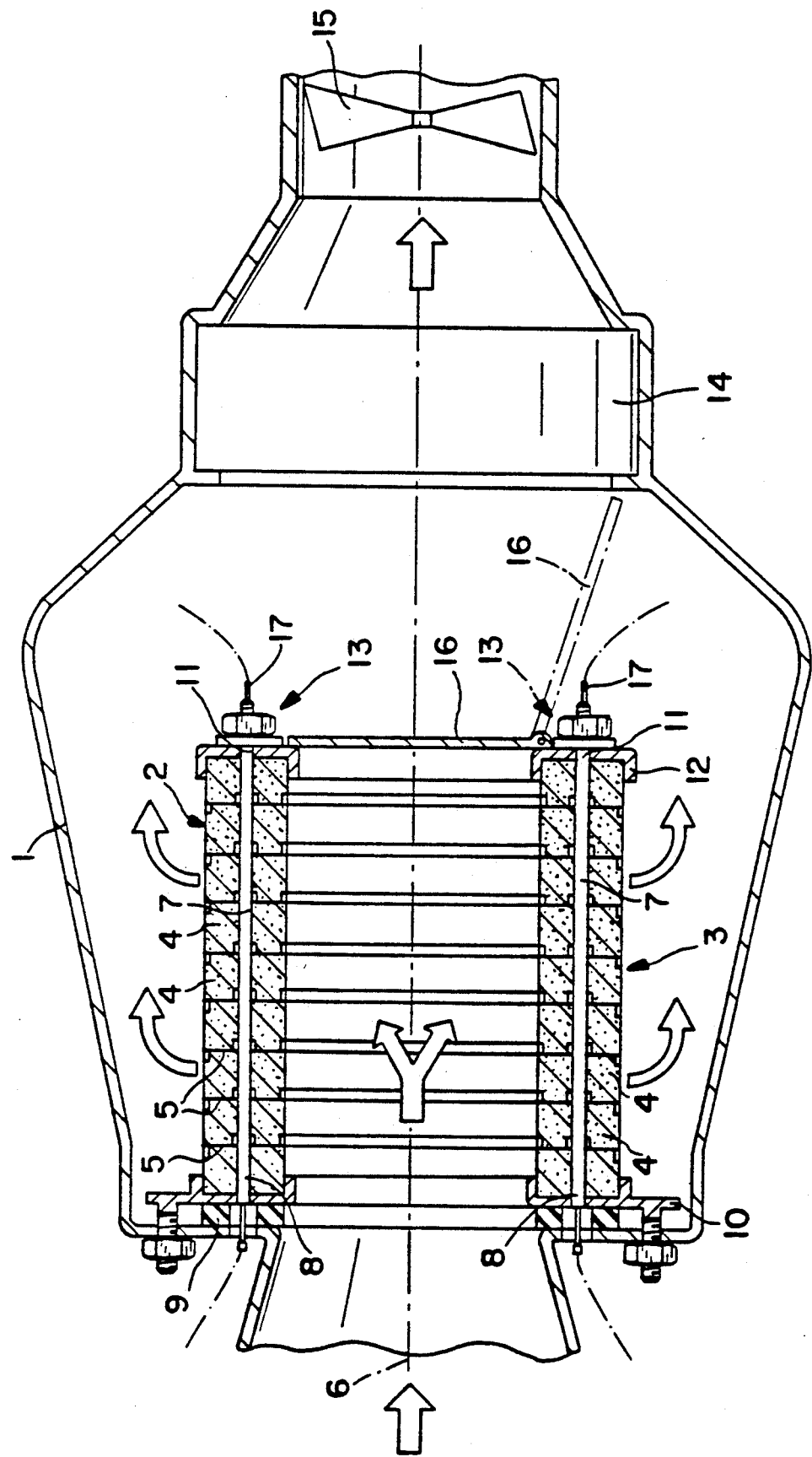

MOTOR VEHICLE FILTER IN THE INLET STREAM OF A HEATING SYSTEM OR AIR-CONDITIONING SYSTEM OF A MOTOR VEHICLE

BACKGROUND AND SUMMARY OF THE INVENTION

The present invention relates to a filter in the inlet stream of a heating or air-conditioning system of a motor vehicle for retaining noxious gaseous components of the air. The filter has a tubular form which has air flowing through it transversely to its central longitudinal axis and one casing end which can be optionally closed or opened by a flap.

A filter is shown in DE-OS 36 26 391 which provides an advantage that, in an atmosphere which is free from or low in noxious substances, the filter can be deactivated by opening a flap and, at the same time, an increased throughflow of air is achieved. In the filter mode, the filter's absorption capacity is exhausted after a specific time so that the filter has to be replaced. This period of time can be lengthened by desorbing the filter at specific time intervals. It is also possible to shorten this process substantially by heating the filter material.

It is an object of the present invention to provide a desorption process which can be carried out quickly, in which case the expenditure necessary for this should be as low as possible.

This object is achieved in accordance with the present invention by constructing a filter comprising layered discs filled with activated carbon and separated from one another in each case by an intermediate layer consisting of material with good heat-conducting properties. The discs and the intermediate layers can be clamped to each other by armatures penetrating the discs in the direction of the central longitudinal axis of the tubular section. The armatures, which have a direct heat-conducting connection to the intermediate layers, can be heated.

In order to heat up the armatures, they are configured as a tube and have cooling water flowing therethrough, if necessary. However, each tube can also have a heating unit connected to an electrical voltage source. The heating can be switched on as desired or even automatically, in which case, when switching on, a timing switch which switches off the heating process again after a predetermined time has expired is expediently started up. During the desorption phase, the air leaving the filter is fed directly into the open air, preferably avoiding the passenger compartment of the motor vehicle. This is achieved in a particularly simple manner by a reversal of the direction of rotation of a heater blower such that air is passed through the filter in the opposite direction to that used in the filter mode.

BRIEF DESCRIPTION OF THE DRAWING

These and further objects, features and advantages of the present invention will become more apparent from the following detailed description of a currently preferred embodiment when taken in conjunction with the accompanying sole figure which is a cross-sectional view of the filter constructed in accordance with the present invention.

DETAILED DESCRIPTION OF THE DRAWING

A filter 2 in the form of a tubular section 3 is arranged in the inlet channel 1 of a heating system or air-conditioning system of a motor vehicle. The filter 2 consists of layered discs 4 filled with activated carbon separated from one another by intermediate layers 5 of a material with good heat conducting properties, such as, for example, aluminum. The discs 4 and the intermediate layers 5 are penetrated by armatures 7 extending in the direction of the central longitudinal axis 6 of the filter 2. The armatures 7 are received at one end 8 by a plate 10 connected to the inlet channel 1 with an interposed seal 9. The other end 11 of each armature 7 ends in an external thread and penetrates a support plate 12 so as to be clamped to the filter 2 by a screw connection 13. Thus, only filtered air which flow through the discs 4 transversely to the central longitudinal axis 6 emerges in the direction of a heat exchanger 14 connected downstream of the filter 2 and of a downstream heater blower 15. The heater blower 15 can, of course, also be connected upstream of the filter so the air to be filtered is then put under pressure by the filter 2.

A flap 16 is mounted on the support plate 12 and can be transferred from the closing position (shown in solid lines) into the open position (shown in dot-dash lines). The open position will then be achieved, for example triggered by a sensor, when the motor vehicle is being used in a pure or only slightly contaminated atmosphere.

In the filtering mode, the air flows into the inside of the filter 2 as shown by the broad arrows, and penetrates the filter 4, while absorbing noxious components by way of the activated carbon transversely to the central longitudinal axis 6. The air then emerges in cleansed form in order to flow off in the direction of the heat exchanger 14.

Each armature 7 is configured as a tube which can be heated in a manner explained later in greater detail. The intermediate layers 5 have connection with a good heat-conducting properties (e.g. aluminum) to the armature 7 so that a rapid heat transfer to the intermediate layers 5 is obtained. The layers 5 thus heat up and pass on heat to the discs 4, which leads to a heating up of the discs 4 and to an acceleration of the desorption process. During this process of regeneration of the filter 2, it is expedient if the air leaving the filter 2 is directed into the open air and avoids the passenger compartment. This is made possible by corresponding channel routing in conjunction with the alternate closing and opening of the flaps which adversely affect the air routing. A particularly simple air routing is obtained if the direction of rotation of the heater blower 15 is reversed so that a flow counter to the broad arrows shown in established. The regeneration phase of the filter 2 occurs expediently at times of low requirement of fresh air or when the motor vehicle is stationary.

Several possible embodiments for heating the armature 7 are available. An easily practicable solution consists in connecting the armatures 7 to the engine cooling water circuit with intermediate connection of a blocking valve. Another equally easily implementable solution provides each armature 7 with an electric heating unit 17 which is connected to a voltage source with intermediate connection of a switch common to all the heating units 17. It is possible, for example, to use the vehicle battery as a voltage source.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A filter of tubular configuration adapted to be operatively arranged in an inlet of a motor vehicle heating/air-conditioning system such that air flows through it transversely to a central longitudinal axis thereof for retaining noxious atmospheric components comprising a flap arranged at one end of the filter, said flap having means to be selectively moved between open and closed positions, layered discs filled with activated carbon operatively arranged in the filter so as to be separated from one another by intermediate layers of good heat-conducting material, and armatures having means for being heated, said armatures having further means for clamping the discs and the intermediate layers to each other, said armatures penetrating the discs in a direction of the central longitudinal axis of the filter and operatively arranged to provide a heat-conducting connection to the intermediate layers.

2. The filter according to claim 1, wherein said armatures are tubes having cooling water flowing therethrough.

3. The filter according to claim 1, wherein said armatures are tubes with a heating unit operatively connectable to an electrical voltage source.

4. A process for regenerating a tubular configured filter arranged in an inlet of a motor vehicle heating/air-conditioning system, comprising the steps of:

closing a flap arranged at one end of the filter which is comprised of activated-carbon discs separated from one another by intermediate layers of heat conducting material and held thereto by heatable armatures penetrating the discs in a direction of the central longitudinal axis of the filter and being directly heat-connected to the intermediate layers;

heating the armature so as to heat the intermediate layers and the discs so as to regenerate the discs; and creating a reverse air flow through the discs to the outside of the motor vehicle.

* * * * *